Jan. 7, 1941.   J. C. HEINTZ   2,228,211
TIRE TREADING METHOD AND PRODUCT
Filed April 6, 1938
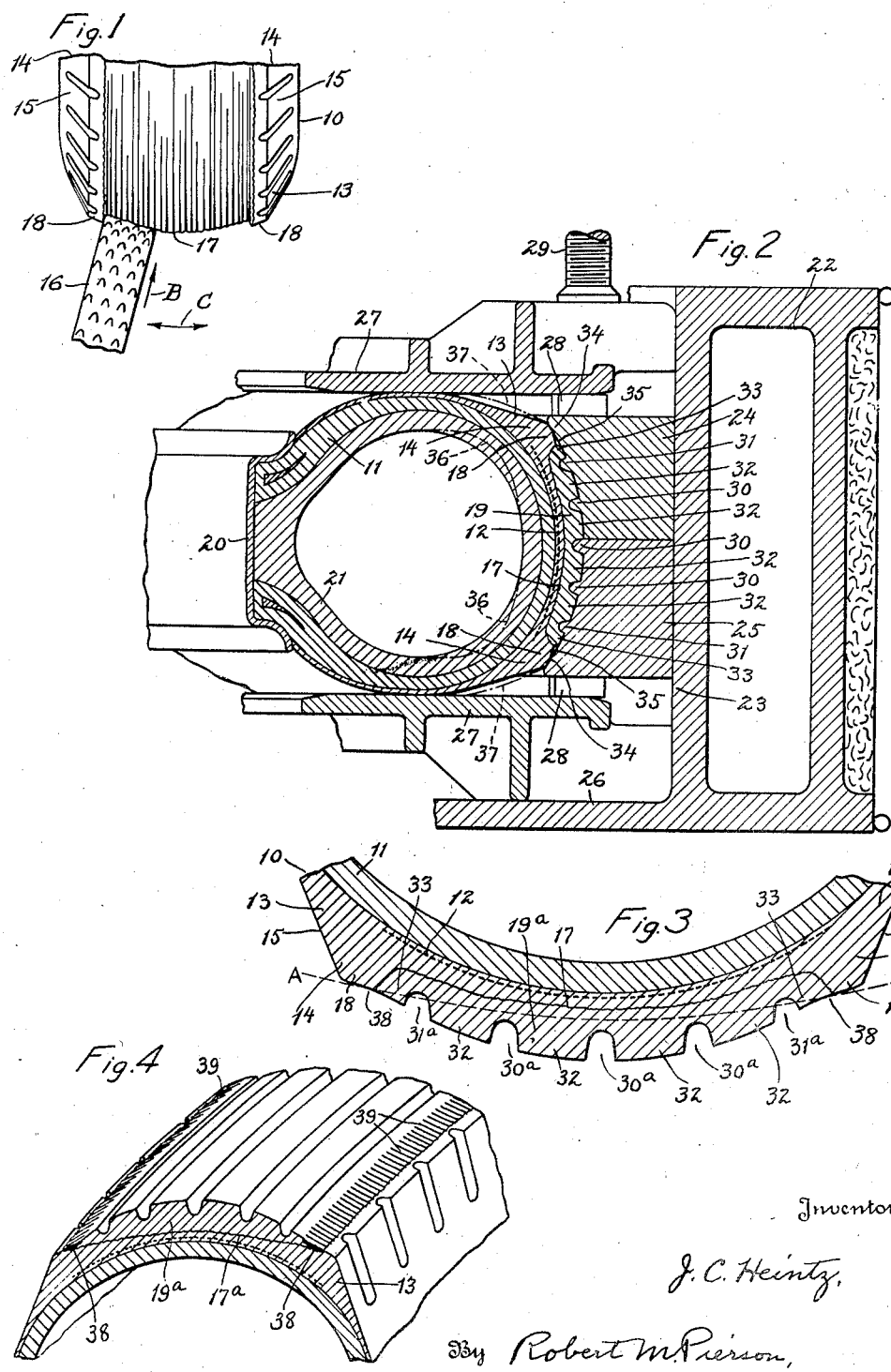

Patented Jan. 7, 1941

2,228,211

UNITED STATES PATENT OFFICE 2,228,211

TIRE TREADING METHOD AND PRODUCT

James C. Heintz, Lakewood, Ohio

Application April 6, 1938, Serial No. 200,380

5 Claims. (Cl. 154—14)

This invention relates to the retreading of pneumatic tires. Its object is to provide an economical full-circle recapping method and an improved product. More particularly it provides for utilizing worn shoulder portions of the original rubber tread in such manner as to afford much the appearance of a new tire, with the identical side configuration, and providing an anti-skid composite wearing surface of old and new rubber, which has the full width of the original tread.

Of the accompanying drawing,

Fig. 1 is a fragmental view illustrating the step of preparing the worn tire tread to receive the new rubber, in a preferred mode of practicing the invention.

Fig. 2 is a vertical sectional view showing the partly inflated tire with new raw tread rubber thereon, in one form of vulcanizer which may be employed.

Fig. 3 is an enlarged cross-sectional view through the tread region of a tire casing which has been retreaded in accordance with the invention.

Fig. 4 is a cross-sectional perspective view showing a modified product.

This application is a continuation in part of my prior application Ser. No. 163,509, filed Sept. 13, 1937.

In the drawing, 10 is a pneumatic tire casing having the usual carcass 11 and fabric breaker strip 12 and a rubber tread 13 from which the original anti-skid formation has been worn away to about the contour line A—A shown in Fig. 3. The rubber may have been worn away more or less deeply, but even on treads worn smooth or worn entirely through the middle zone of the rubber, there remain considerable depths of shoulder rubber 14 which retain their original configuration at the sides or flanks 15. These original shoulders have a superior adhesion to the carcass which it is difficult to reproduce in applying a full retread after removing all of the old tread rubber.

Fig. 1 illustrates a preferred mode of preparing the worn tread. The tire casing 10, mounted with an inflated air tube upon a suitable rim, is turned slowly against a rapidly rotating rasp wheel 16 which is mounted to receive a radial in-feed, shown by the arrow B, and a reciprocating arcuate lateral traverse shown by the double-ended arrow C. The operator so regulates these feeding actions that the vulcanized tread rubber is channeled or gouged out in a shallow grooved bed 17. This bed has a convex bottom approximately conforming to the transverse curvature of the carcass and deepest in the tread shoulders 14, but terminates short of the edges of said shoulders so as to preserve the remaining full radial tread depth for a substantial width of marginal ground-contacting or sole surface on each side, and leaves a pair of outstanding marginal ribs 18 whose working or wearing surfaces are those of the original worn shoulders.

The next step is to cement the bed 17 and lay thereon, to the necessary depth, vulcanizable raw rubber tread stock 19 which, when cured, becomes an integral resilient rubber tread cap substantially homogeneous with, or of the same properties as the middle body of the original tread. The tire casing, mounted upon a suitable rim 20 and containing the usual inflatable rubber core or curing bag 21, is then inserted, in an uninflated condition, in the lower side or half of a suitable tread vulcanizing mold. The diameter and cross-sectional width of the tire are measured after building the raw tread thereon, and a mold having approximately the same diameter of tread cavity is selected. If the uninflated tire diameter is a little undersize, it is increased in the mold by compressing the tire sides, and if slightly oversize, some force is used in fitting the tire into the lower half of the mold, before closing the upper half thereon.

The heater part of the vulcanizing apparatus may be of any known or suitable form, the one here illustrated being a steam-jacketed structure 22 having a cylindrical backing wall 23 for a pair of rings 24, 25 constituting a molding matrix, preferably segmental, longitudinally divided, made of aluminum and usable with an ordinary spacer ring (not shown) between them, if required for certain tread widths. The heater also has a lower shelf 26 for supporting the lower one of a pair of side pressure cooling or non-vulcanizing plates or rings 27 whose inner faces tangentially engage the tire sides. The matrix may be spaced from these pressure plates by a series of spacer blocks 28 distributed about its circumference, and of a selected predetermined depth whereby the amount of lateral distortion of the tire is controlled and the rings 24, 25 centralized between the plates 27. The molding assembly is clamped together by downward pressure exerted on the upper side plate 27 by a series of the usual clamping screws 29. By reason of the illustrated radial and lateral spacing of the bodies of the rings 27 from the steam jacket and the matrix, providing large ventilation and small heat conduction to said rings, their temperature is maintained well below the vulcanizing point, to prevent overheating of the tire side walls.

The inner molding face of the matrix formed by the rings 24, 25 is transversely concave, and free-edged or without terminal flanges, to seal the tread at its margins and mold a complemental convex wearing face upon the new tread rubber 19, while the tread portion of the carcass 11 is maintained in substantially its normal transversely convex form. This avoids the creation of cracking strains in the retread, incident to rounding out the tire for service after vulcanizing a tread in flat form on an underlying concave carcass wall. The absence of lateral confinement at the edges of the tread permits full-width treads of various widths to be formed in the same vulcanizer against a matrix wider than the tread, which will generally overhang the edges thereof.

From the inner faces of the matrix rings project suitable intermediate ribs 30 and outer ribs 31 for molding complemental longitudinal grooves 30ª, 31ª and adjacent intermediate anti-skid ribs or projections 32 and marginal half-ribs 33 in the new tread. The outer ribs 31 are of a depth permitting the rubber to freely flow under them, in filling out the desired marginal tread contour, and the bottoms of the outermost grooves 31ª formed thereby as shown in Fig. 3 will preferably lie within the contour of the tread surfaces of the rubber ribs 18, or the worn contour line A—A, and in any event are wholly within the new rubber. The concave marginal faces 34 of the matrix rings, lying laterally outward of the ribs 31, act as sealing faces against which the soles of the ribs 18 are pressed, and as flush molding faces for the marginal portions of the new tread rubber, where it joins the old rubber of said ribs.

In Fig. 2 the full lines represent the approximate shape of the tire when it has been partly inflated in the mold and its new tread rubber 19 indented by the ribs of the heated matrix. The tire sides are only slightly flattened. The outer portions of the marginal tread ribs 18 are lightly pressed against the molding faces 34, but slight clearances 35 are present between the inner portions of these ribs and said molding faces. On raising the inflation to the full curing pressure, which may be around 150 to 200 pounds per square inch, the curing bag and shoulder flank walls of the tire are laterally and radially expanded as shown by the broken lines 36, 37, and the tread margins forced radially outward, slightly beyond their ultimate contour, to eliminate the clearances 35 and completely seal the tread shoulders against substantial lateral flow of the new rubber outwardly beyond the ribs 18, except for such small amounts as may overflow into shoulder crevices in some forms of original tread patterns. The vulcanized new rubber tread portion is designated 19ª. This brings the joints or seams between new and old rubber at the wearing surface of the tread margins. While the described method is not wholly limited to forming such transversely flush joints, it is desirable to avoid abrupt marginal shoulder flanks on a relatively narrow recap band having no base fillets, the side strains on which would tend to open the seams and start separation. On deflation of the retreaded tire and its removal from the vulcanizer, the sole faces of the composite tread shoulders 18, 33 recede slightly and become annularly somewhat concave as shown at 38 in Fig. 3.

In the operation of the retreaded tire, before its tread becomes greatly worn, the composite tread shoulders, being relatively lower than in the original tire, are relieved of much or all of the ground pressure at normal load and inflation, while contributing to the lateral support of the middle or working tread zone, but are available for ground support during fluctuating or steady overloads or underinflation. A full-width rebuilt tread of this contour may be even longer wearing than a new tread under like running conditions, and tread separation or breaking down at the shoulders is much less likely to occur than with full retreads.

In a section of the retreaded tire, the cemented line of junction of old and new rubber, coinciding with the bed 17, is plainly visible, but with proper workmanship, a perfect vulcanized union of the two is obtained. The method is highly economical in the amount of rubber employed, skill in the performance thereof is easily acquired, and the product has practically the appearance of a new tire.

In making the modified product represented in Fig. 4, employing even less new rubber, the step of channeling the old rubber tread is omitted and a bed outlined at 17ª prepared on the latter by merely buffing the worn surface preparatory to cementing for the new tread, or even that roughening may be omitted and the worn surface merely cleaned with a solvent before cementing. The procedure is otherwise as previously described. This view indicates very shallow, closely spaced transverse ribbing 39 molded in the margins of the new rubber and across the joints between it and the old rubber, such as may be impressed by indenting the mold with a knurling tool. The same could be applied to the product of Figs. 2 and 3. In this manner a non-functional, ornamental or identifying marking may be molded upon the tread margins, and because of the concave surfaces 38 upon which these markings are formed, they will last practically until the new tread has been again worn down to the first worn contour.

I claim:

1. A retreaded pneumatic tire having a wearing tread of substantially homogeneous resilient rubber composition, with sole surfaces which, as a whole, are transversely convex throughout and laterally limited by abrupt flanking surfaces, comprising new rubber vulcanized between lateral worn shoulders formed by marginal sole portions of the old tread, said new rubber being so disposed with respect to said shoulders that the ground-engaging surface thereof is substantially flush with that of the shoulders adjacent to the points of junction between said new rubber and said shoulders, permitting the original worn shoulders to act as marginal supporting surfaces when the tread is fully flattened transversely against the ground, the convexity of the new rubber surface being greater than that of the shoulders.

2. A method of retreading a worn pneumatic tire with worn old rubber tread shoulders which comprises channeling out old rubber from between said old worn tread shoulders applying, in a full circle between said shoulders, vulcanizable rubber of a composition substantially homogeneous with the old rubber, placing the tire, with its tread in transversely convex shape, in a confined position against overlying transversely concave molding and marginal sealing surfaces which cooperate with the sole surfaces of the shoulders to render the margins of the new rubber substantially flush with said shoulders, confining the sides of the tire against lateral expansion while permitting its expansion between the sides and the tread shoulders, applying outward radial pressure to the tire to cause the shoulders to engage said overlying surfaces tightly and substantially prevent lateral flow of the new rubber, and vulcanizing the latter while the tire is so confined at tread and sides.

3. A method according to claim 2 in which, preparatory to applying the new rubber, the old tread rubber is channeled out by removing a portion thereof, over a width narrower than the tread, to leave outstanding marginal rubber shoulder ribs which act as dams confining the new rubber and becoming vulcanized thereto.

4. A method according to claim 2 in which the old rubber tread surface is left substantially in its transverse worn contour throughout the width of said surface, and the new rubber is applied over such worn contour prior to vulcanization.

5. The method of retreading a worn pneumatic tire the tread shoulders of which are still laterally limited by abrupt flanking surfaces which comprises channeling out old rubber from between said flanking surfaces around the entire circumference of the tire to leave at least a portion of said flanking surfaces and between them a channel with a convex bottom approximately conforming to the transverse curvature of the carcass, placing a full circle of vulcanizable tread stock in the channel and vulcanizing said tread stock to the bottom and side walls of the channel.

JAMES C. HEINTZ.